(12) United States Patent
Larsen et al.

(10) Patent No.: US 10,180,203 B2
(45) Date of Patent: Jan. 15, 2019

(54) UNDERWATER PIPE AND CONNECTOR ASSEMBLY AND METHOD OF ASSEMBLING AN UNDERWATER PIPE AND A CONNECTOR

(71) Applicants: Jan Larsen, Nicosia (CY); Chen-Shan Kung, Taipei (TW); Yuan-Jui Lu, Taipei (TW)

(72) Inventors: Jan Larsen, Nicosia (CY); Chen-Shan Kung, Taipei (TW); Yuan-Jui Lu, Taipei (TW)

(*) Notice: Subject to any disclaimer, the term of this patent is extended or adjusted under 35 U.S.C. 154(b) by 263 days.

(21) Appl. No.: 15/182,372

(22) Filed: Jun. 14, 2016

(65) Prior Publication Data

US 2016/0377202 A1 Dec. 29, 2016

(30) Foreign Application Priority Data

Jun. 24, 2015 (TW) .............................. 104120328 A

(51) Int. Cl.
*F16L 47/24* (2006.01)
*F16L 13/14* (2006.01)
(Continued)

(52) U.S. Cl.
CPC ............ *F16L 47/24* (2013.01); *B29C 65/348* (2013.01); *B29C 65/3424* (2013.01);
(Continued)

(58) Field of Classification Search
CPC . F16L 13/147; F16L 13/0272; F16L 13/0227; F16L 47/24; F16L 47/03; B29C 65/3432; B29C 65/3424
(Continued)

(56) References Cited

U.S. PATENT DOCUMENTS 2,962,305 A * 11/1960 McCarthy ............... F16L 47/03
4,365,144 A * 12/1982 Reich ...................... F16L 47/03
285/21.2 X
(Continued)

FOREIGN PATENT DOCUMENTS

CN 1989367 A 6/2007
CN 201152409 Y 11/2008
(Continued)

OTHER PUBLICATIONS

SI10201604546S Search Report and Written Opinion from the Intellectual Property Office of Singapore dated Feb. 27, 2017 (7 pages).
(Continued)

*Primary Examiner* — Greg Binda
*Assistant Examiner* — Zachary T Dragicevich
(74) *Attorney, Agent, or Firm* — Michael Best & Friedrich LLP

(57) ABSTRACT

An underwater pipe and connector assembly includes an underwater pipe having a pipe body and an annular connecting end section, a connector fixed in the connecting end section, and at least one reinforcing layer having a first fixed cover section fused to and fixedly covering the connecting end section, and a second fixed cover section fused to and fixedly covering an outer circumferential surface of the pipe body immediately adjacent the connecting end section. An outer coil is embedded between the first fixed cover section and the connecting end section and between the second fixed cover section and the outer circumferential surface of the pipe body immediately adjacent the connecting end section.

9 Claims, 7 Drawing Sheets

(51) Int. Cl.
*F16L 47/03* (2006.01)
*B29C 65/34* (2006.01)
*B29C 65/48* (2006.01)
*B29C 65/50* (2006.01)
*B29C 65/00* (2006.01)

(52) U.S. Cl.
CPC ...... *B29C 65/3432* (2013.01); *B29C 65/3476* (2013.01); *B29C 65/4815* (2013.01); *B29C 65/5021* (2013.01); *B29C 65/5042* (2013.01); *B29C 66/1122* (2013.01); *B29C 66/1222* (2013.01); *B29C 66/1224* (2013.01); *B29C 66/52295* (2013.01); *B29C 66/5344* (2013.01); *B29C 66/634* (2013.01); *B29C 66/742* (2013.01); *B29C 66/8286* (2013.01); *F16L 13/147* (2013.01); *F16L 47/03* (2013.01); *B29C 66/71* (2013.01); *B29C 66/8223* (2013.01)

(58) Field of Classification Search
USPC ............ 285/21.2, 222.4, 222.5, 288.5, 293.1
See application file for complete search history.

(56) References Cited

U.S. PATENT DOCUMENTS

| | | | | |
|---|---|---|---|---|
| 4,436,987 A | * | 3/1984 | Thalmann | F16L 47/03 |
| 4,718,698 A | | 1/1988 | Hill | |
| 4,842,305 A | | 6/1989 | Kistenich et al. | |
| 5,820,720 A | * | 10/1998 | Campbell | 285/21.2 X |
| 2006/0182954 A1 | | 8/2006 | Bowman et al. | |
| 2010/0295299 A1 | | 11/2010 | Ziu | |
| 2013/0134700 A1 | | 5/2013 | Duncan et al. | |

FOREIGN PATENT DOCUMENTS

| | | |
|---|---|---|
| CN | 102537571 A | 7/2012 |
| CN | 202402867 U | 8/2012 |
| CN | 102829276 A | 12/2012 |

OTHER PUBLICATIONS

TW104120328 Taiwan Search Report dated Apr. 22, 2016 (2 pages).

* cited by examiner

UNDERWATER PIPE AND CONNECTOR ASSEMBLY AND METHOD OF ASSEMBLING AN UNDERWATER PIPE AND A CONNECTOR

CROSS REFERENCE TO RELATED APPLICATION

This application claims priority of Taiwanese Application No. 104120328, filed on Jun. 24, 2015.

FIELD

The disclosure relates to a water pumping equipment, more particularly to an underwater pipe and connector assembly and the method of assembling a large-diameter underwater pipe and a connector.

BACKGROUND

Referring to FIG. 1, an existing large-diameter underwater pipe assembly for pumping seawater is composed of a plurality of interconnected pipes 101. Each pipe 101 includes a pipe body 101, and two connectors 102 respectively fixed to two opposite ends of the pipe body 101. By interconnecting the connectors 102 of two adjacent pipes 10, the length of the underwater pipe assembly can be prolonged. To facilitate the production, the pipe body 101 and the two connectors 102 are separately produced, after which the connectors 102 are welded to the two opposite ends of the pipe body 101.

However, a welded junction between the pipe body 101 and a corresponding one of the connectors 102 has an uneven shape, so that turbulence and resistance during pumping of the seawater are prone to occur. Furthermore, the structural strength of the welded junction between the pipe body 101 and the corresponding connector 102 is insufficient, so that it is susceptible to torque and pressure, thereby generating breakage.

SUMMARY

Therefore, an object of the disclosure is to provide an underwater pipe and connector assembly that has a simple structure and that can enhance binding strength.

Another object of the disclosure is to provide a method of assembling an underwater pipe and a connector.

According to one aspect of the disclosure, an underwater pipe and connector assembly comprises an underwater pipe, a connector and a reinforcing unit. The underwater pipe is made of plastic and has a pipe body extending along a longitudinal axis, and an annular connecting end section at one end of the pipe body. The pipe body has inner and outer circumferential surfaces. The connector is made of metal and includes a tubular connector body extending along the longitudinal axis and fixed in the connecting end section, an annular flange extending radially and outwardly from a peripheral end of the connector body, and an inner coil embedded between the connector body and the connecting end section. The reinforcing unit surrounds the pipe body at a position corresponding to a junction between the pipe body and the connector body, and includes at least one annular reinforcing layer made of plastic and at least one outer coil. The at least one annular reinforcing layer includes a first fixed cover section fused to and covering the connecting end section, and a second fixed cover section connected to the first fixed cover section along the longitudinal axis (L) and fused to and covering the outer circumferential surface of said pipe body immediately adjacent said connecting end section. The at least one outer coil extends from the first fixed cover section to the second fixed cover section and is embedded between the first fixed cover section and the connecting end section and between the second fixed cover section and the outer circumferential surface of the pipe body immediately adjacent the connecting end section.

According to another aspect of the disclosure, a method of assembling an underwater pipe and a connector comprises the steps of:

(A) preparing a connector, an underwater pipe, a reinforcing unit and a clamping unit, the connector being made of metal and including a tubular connector body extending along a longitudinal axis, an inner coil sleeved on an outer circumferential surface of the connector body, and an annular flange extending radially and outwardly from a peripheral end of said connector body, the underwater pipe being made of plastic and including a pipe body extending along the longitudinal axis and an annular connecting end section at one end of the pipe body, the reinforcing unit including at least one annular reinforcing layer made of plastic and at least one outer coil, the at least one annular reinforcing layer including a first fixed cover section and a second fixed cover section connected to the first fixed cover section along the longitudinal axis;

(B) inserting the connector body into the connecting end section of the underwater pipe so as to press radially outward the connecting end section;

(C) consecutively disposing the at least one outer coil and the at least one annular reinforcing layer around the underwater pipe such that the first fixed cover section of the at least one annular reinforcing layer corresponds to the tubular connector body and the connecting end section of the underwater pipe and such that the second fixed cover section of the at least one annular reinforcing layer corresponds to an outer circumferential surface of the pipe body immediately adjacent the connecting end section;

(D) clamping tightly the reinforcing unit around the underwater pipe using the clamping unit;

(E) energizing the inner coil and the at least one outer coil so as to generate heat which melts the connecting end section, the pipe body immediately adjacent the connecting end section, and the at least one annular reinforcing layer to integrally connect the underwater pipe and the reinforcing unit as one body and to fixedly connect the connecting end section and the connector; and (F) removing the clamping unit from the underwater pipe.

BRIEF DESCRIPTION OF THE DRAWINGS

Other features and advantages of the present disclosure will become apparent in the following detailed description of the embodiment with reference to the accompanying drawings, of which.

DETAILED DESCRIPTION

Figure 1:
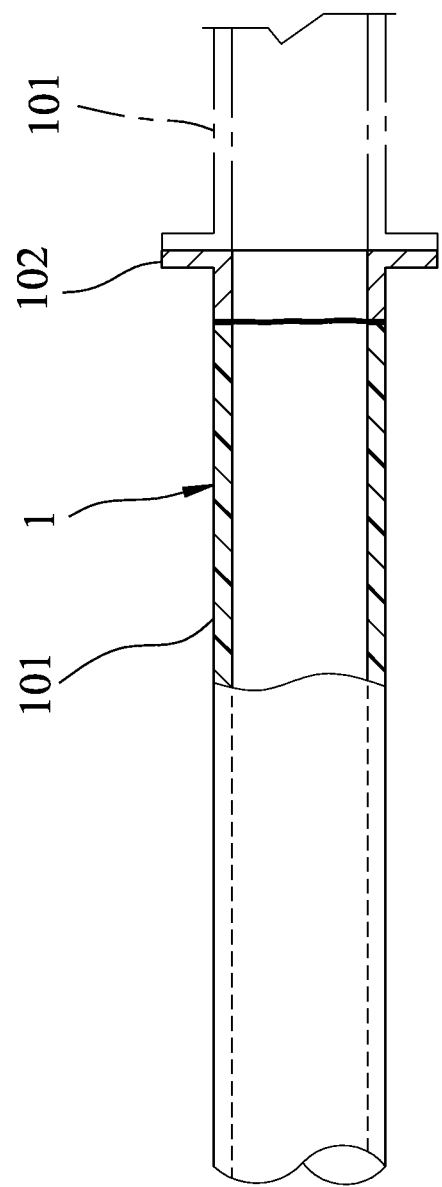
FIG. 1 is a fragmentary partly sectional view for illustrating how two adjacent pipes of an existing large-diameter underwater pipe assembly are connected.
Figure 2:
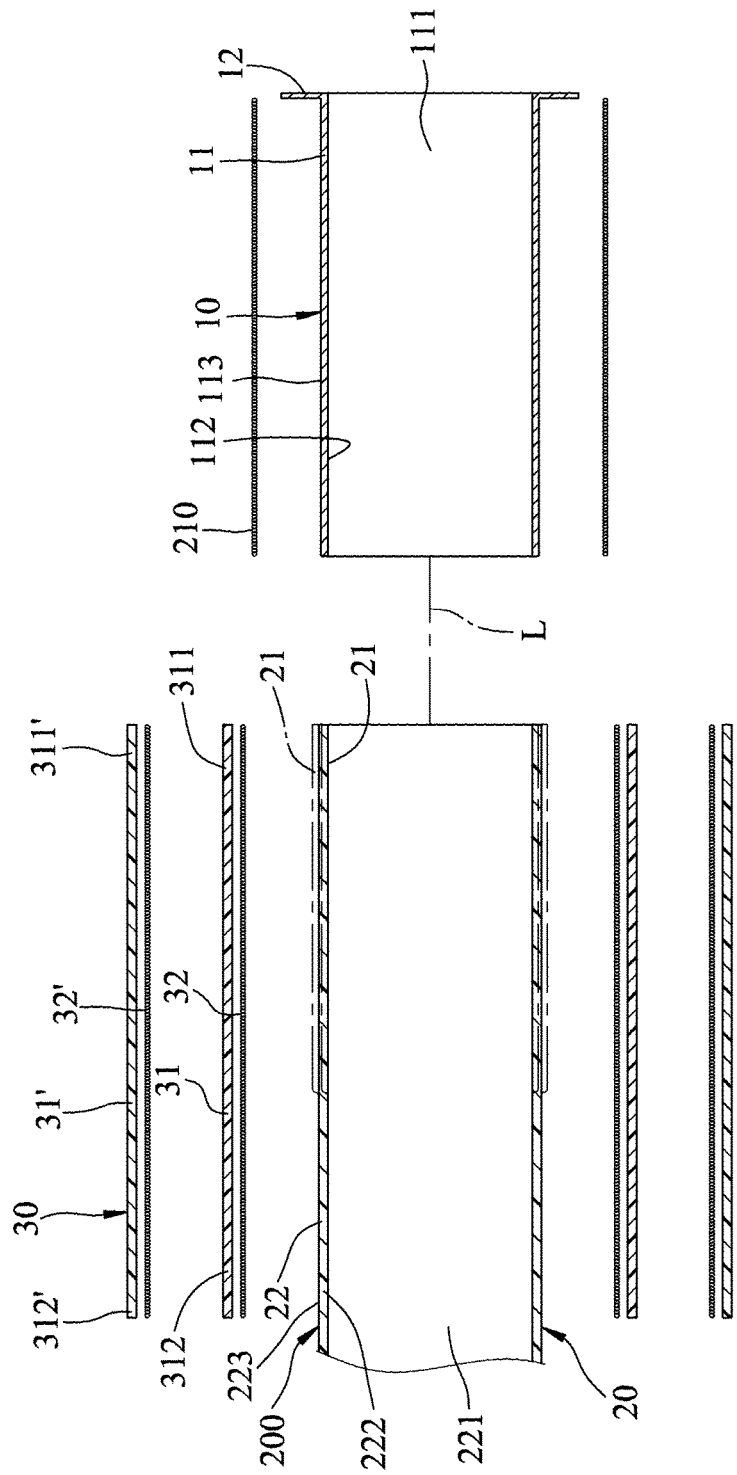
FIG. 2 is an exploded sectional view of an underwater pipe and connector assembly according to the embodiment of the present disclosure.

Referring to FIGS. 2 to 7, an underwater pipe and connector assembly according to the embodiment of the present disclosure comprises a connector 10, a large-diameter underwater pipe 20, a reinforcing unit 30 and a clamping unit 40.

The connector 10 is made of metal, and includes a tubular connector body 11 extending along a longitudinal axis (L), and an annular flange 12 extending radially and outwardly from a peripheral end of the connector body 11. The connector body 11 has an inner circumferential surface 112 surrounding the longitudinal axis (L) and defining an axially extending hole 111, an outer circumferential surface 113 opposite to the inner circumferential surface 112, and a wave pattern 114 (see FIG. 4) formed on the outer circumferential surface 113. An inner coil 210, which is made of copper wire, is sleeved on the outer circumferential surface 113, and surrounds the wave pattern 114.

The large-diameter underwater pipe 20 is made of plastic, such as polyethylene (PE), and extends along longitudinal axis (L). The underwater pipe 20 has a pipe body 200, and an annular connecting end section 21 at one end of the pipe body 200. The pipe body 200 has an inner circumferential surface 222 defining an axially extending hole 221, and an outer circumferential surface 223 opposite to the inner circumferential surface 222.

The reinforcing unit 30 is disposed on the outer circumferential surface 223 of the pipe body 200, and includes at least one annular reinforcing layer 31 made of plastic, such as polyethylene or polypropylene, and at least one outer coil 32 made of copper wire. In this embodiment, the reinforcing unit 30 includes an annular first reinforcing layer 31 sleeved on the outer circumferential surface 223 of the pipe body 200, a first outer coil 32 disposed between the first reinforcing layer 31 and the outer circumferential surface 223, an annular second reinforcing layer 31' sleeved on an outer peripheral surface of the first reinforcing layer 31, and a second outer coil 32' disposed between the first and second reinforcing layers 31, 31'. The first and second reinforcing layers 31, 31' and the pipe body 200 cooperatively form a three-layer reinforcing structure. The first reinforcing layer 31 includes a first fixed cover section 311 fixedly covering the connecting end section 21, and a second fixed cover section 312 connected to the first fixed cover section 311 along the longitudinal axis (L) and fixedly covering the outer circumferential surface 223 of the pipe body 200 immediately adjacent the connecting end section 21. The second reinforcing layer 31' includes a first fixed cover section 311' covering the first fixed cover section 311, and a second fixed cover section 312' connected to the first fixed cover section 311' along the longitudinal axis (L) and covering the second fixed cover section 312. The first outer coil 32 extends from the first fixed cover section 311 to the second fixed cover section 312. The second outer coil 32' extends from the first fixed cover section 311' to the second fixed cover section 312'.

Figure 3:
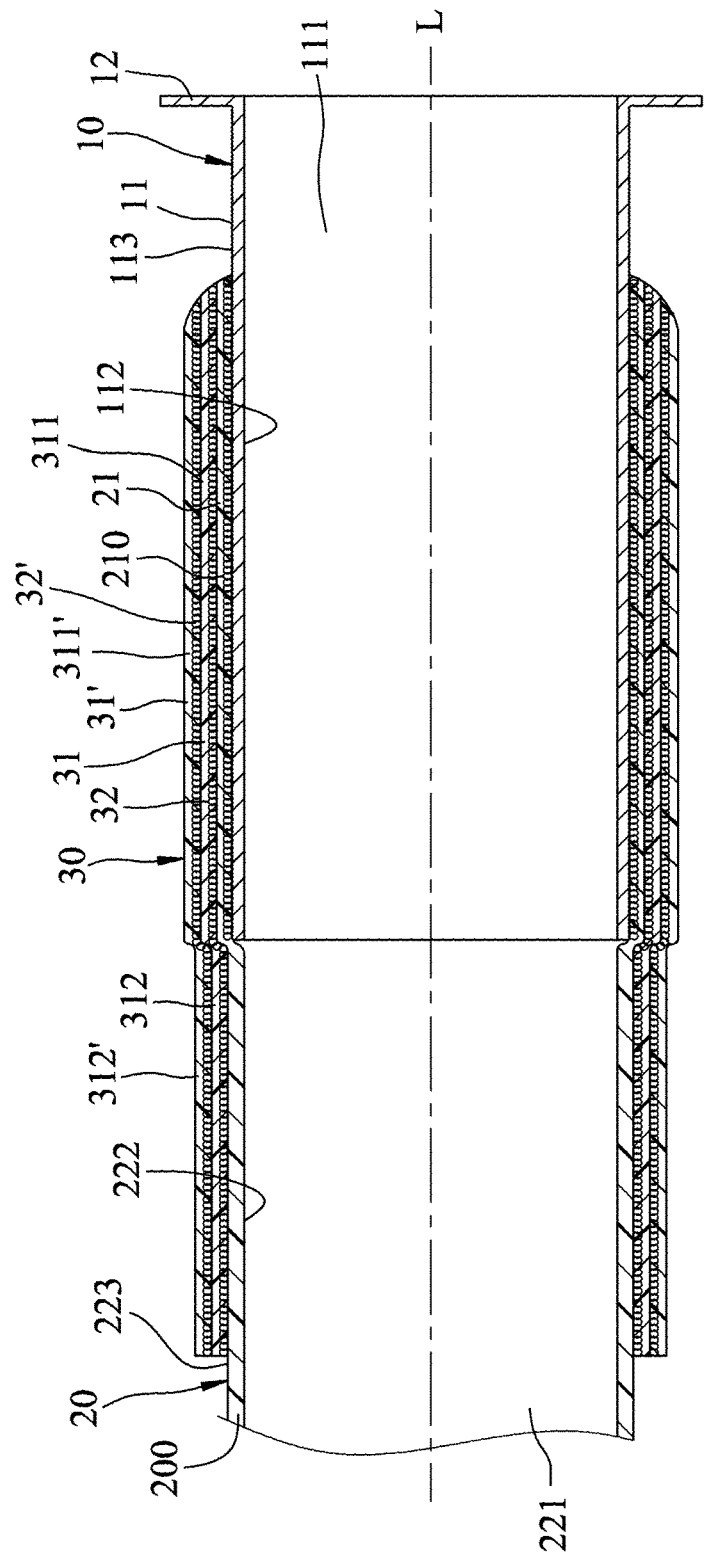
FIG. 3 is an assembled sectional view of the embodiment.
Figure 4:
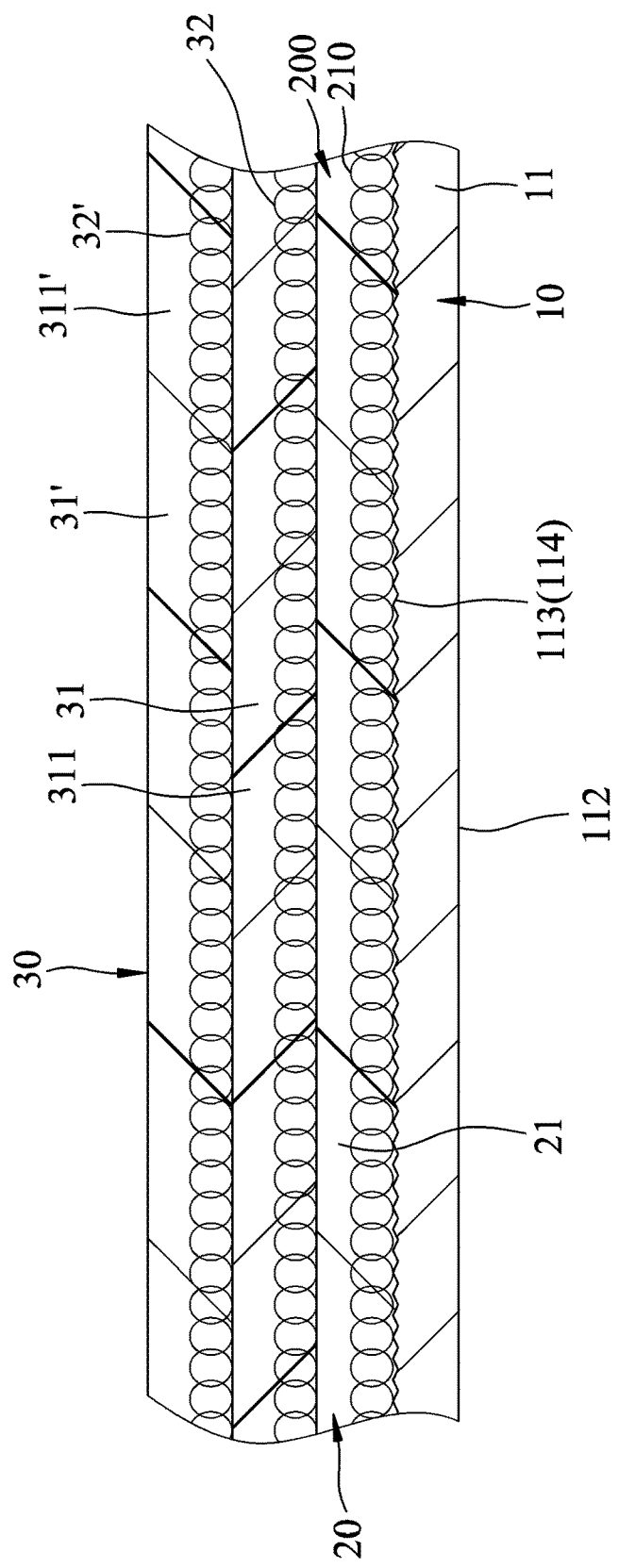
FIG. 4 is an enlarged fragmentary sectional view of a portion of FIG. 3.

When the connector body 11 is inserted into one end of the pipe body 200 with the inner coil 210 located between the connecting end section 21 and the connector body 11, as shown in FIG. 3, the connecting end section 21 of the pipe 20 is pressed outwardly and radially by the connector body 11 to expand such that an outer diameter of the connecting end section 21 is larger than that of the pipe body 200, an outer diameter of the first fixed cover section 311 or 311' is larger than that of the second fixed cover section 312 or 312', a length of the first fixed cover section 311 or 311' along the longitudinal axis (L) is greater than that of the second fixed cover section 312 or 312', and the inner circumferential surfaces 222, 112 of the pipe body 200 and the connector body 11 are flush with each other. The axially extending holes 111, 221 of the connector body 11 and the pipe body 200 communicate with each other.

Figure 5:
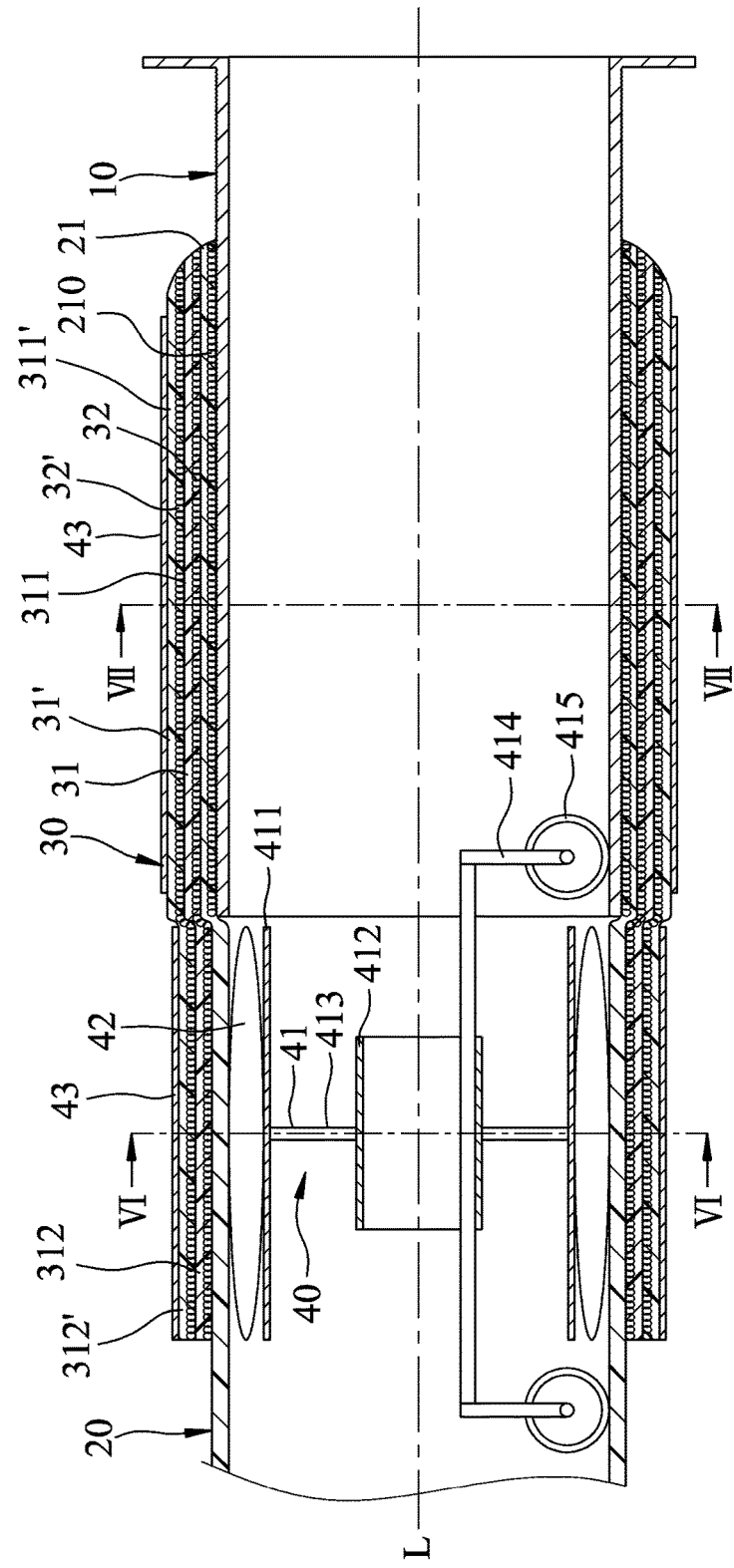
FIG. 5 is a sectional view, illustrating a method of assembling an underwater pipe and a connector according to the embodiment of the present disclosure.
Figure 6:
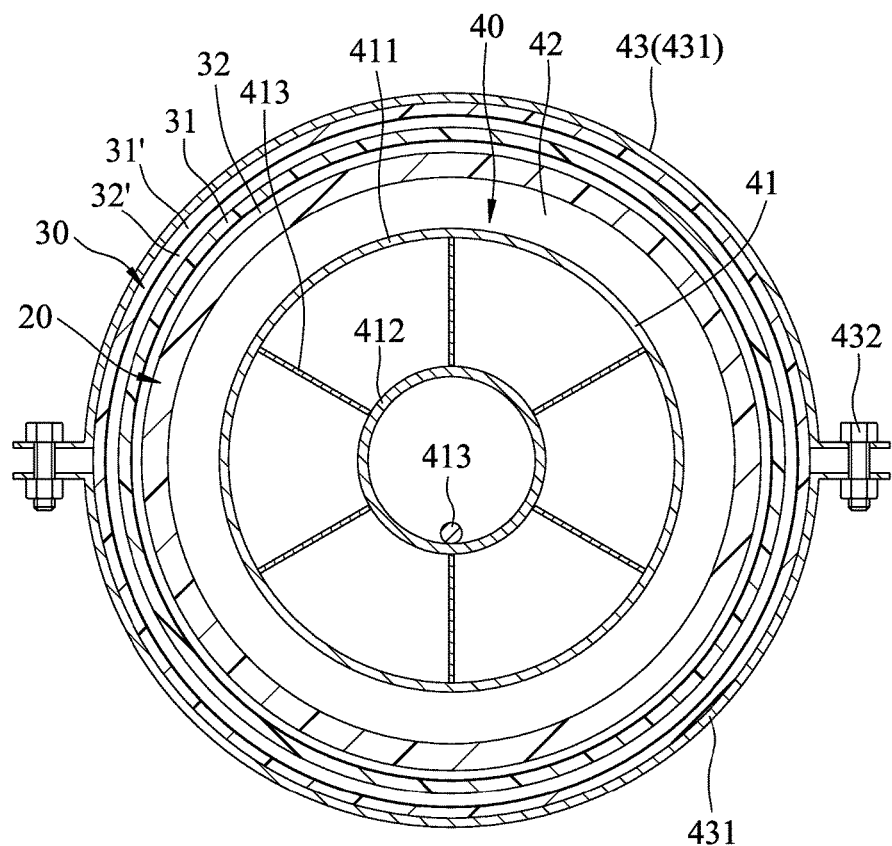
FIG. 6 is a sectional view of the embodiment taken along line VI-VI of FIG. 5.
Figure 7:
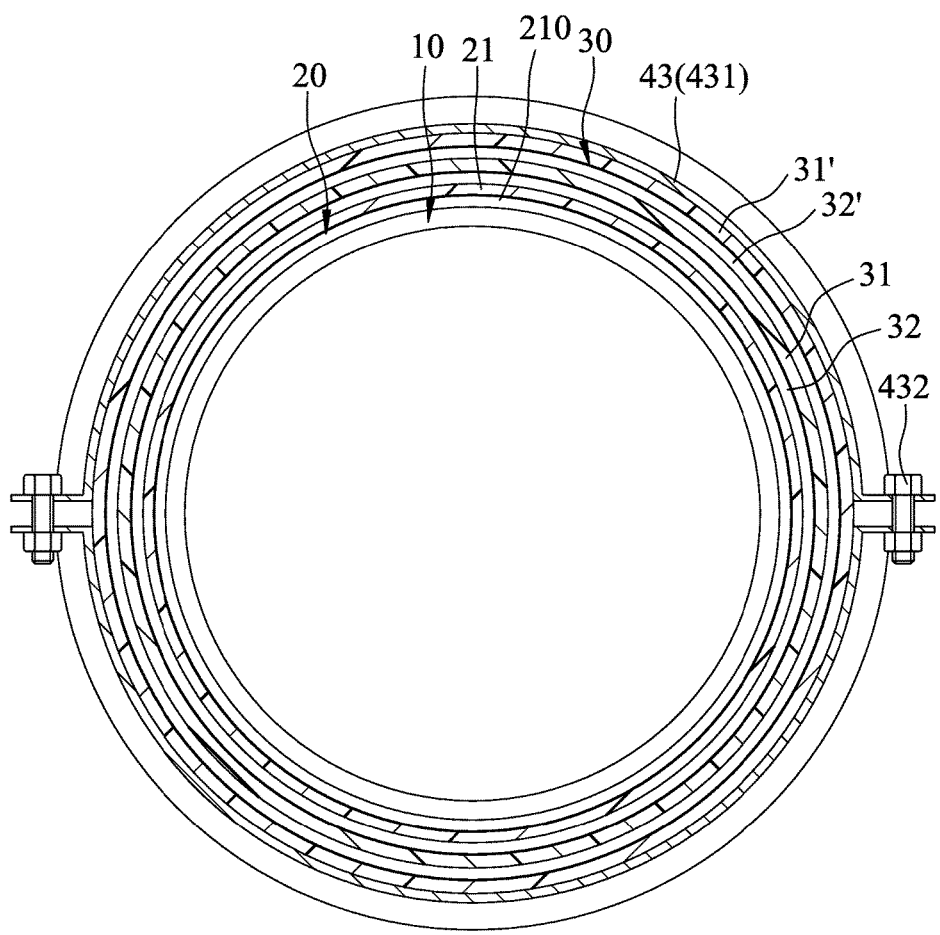
FIG. 7 is a sectional view of the embodiment taken along line VII-VII of FIG. 5.

With reference to FIGS. 5 to 7, the clamping unit 40 is removably mounted on the pipe body 200 at a position corresponding to the junction between the pipe body 200 and the connector body 11. The clamping unit 40 includes a support member 41 movably disposed at a position corresponding to the inner circumferential surface 222 of the pipe body 200 immediately adjacent the connecting end section 21, an inflatable ring 42 disposed between the support member 41 and the inner circumferential surface 222 of the pipe body immediately adjacent the connecting end section 21, and two clamping members 43 detachably clamped around an outer portion of the reinforcing unit 30. The support member 41 includes a support ring 411 surrounding the longitudinal axis (L), a connecting ring 412 disposed inside the support ring 411, a plurality of angularly spaced-apart spokes 413 connected between the support ring 411 and the connecting ring 412, a cross frame 414 connected to the connecting ring 412, and a plurality of rollers 415 mounted on the cross frame 414 and rollable on the inner circumferential surfaces 222, 112 of the pipe body 200 and the connector body 11. The cross frame 414 is configured as an inverted U-shaped frame. Each clamping member 43 includes a pair of semi-circular clamping frames 431 detachably coupled to each other through a plurality of bolts 432.

After the connector body 11 is inserted into the connecting end section 21 of the pipe 20, as shown in FIG. 5, the support member 41 and the inflatable ring 42 are moved inside the connector body 11 and the pipe body 200 along the longitudinal axis (L) to a position corresponding to the inner circumferential surface 222 of the pipe body 200 immediately adjacent the connecting end section 21 through the rollers 415, after which the clamping frames 431 of the clamping members 43 are respectively clamped and tightened around the first and second fixed cover sections 311', 312' of the reinforcing unit 30.

As shown in FIGS. 5 to 7, the inflatable ring 42 is then inflated to expand radially outward so that the pipe 20 and the reinforcing unit 30 are pressed radially outward by the support member 41, while the clamping member 43, which is sleeved on the second fixed cover section 312', moves radially inward to generate a clamping effect on the pipe body 200 immediately adjacent the connecting end section 21, and the clamping member 43, which is sleeved on the first fixed cover section 311', also moves radially inward to generate a clamping effect on the connecting end section 21. Simultaneously, the inner coil 210 and the outer coils 32, 32' are energized to generate heat which melts the connecting end section 21, the pipe body 200 immediately adjacent the connecting end section 21, and the first and second reinforcing layers 31, 31' so that they are integrally connected as one body, and the connecting end section 21 is further welded to the connector body 11. The inner coil 210 is completely embedded between the connecting end section 21 and the connector body 11, so that generation of voids and bubbles can be prevented. By the same token, the outer coil 32 is completely embedded between the pipe body 200 immediately adjacent the connecting end section 21 and the second fixed cover section 312 and between the connecting end section 21 and the first fixed cover section 311, while the outer coil 32' is completely embedded between the second fixed cover sections 312 and 312' and between the first fixed cover sections 311 and 311', so that generation of voids and bubbles can be similarly prevented. Moreover, through the wave pattern 114 of the connector body 11, a good meshing effect can be obtained between the connecting end section 21 and the connector body 11.

Referring again to FIGS. 3 and 4, after the reinforcing layers 31, 31' are fused to the pipe body 200, and the connector 10 is fixed to the connecting end section 21, the clamping unit 40 can then be removed from the pipe body 200. Because the inner coil 210 is embedded between the connector body 11 and the connecting end section 21, the outer coil 32 is embedded between the pipe body 200 immediately adjacent the connecting end section 21 and the second fixed cover section 312 and between the connecting end section 21 and the first fixed cover section 311, and the outer coil 32' is embedded between the second fixed cover sections 312 and 312' and between the first fixed cover sections 311 and 311', the structural strength of the junction between the pipe 20 and the connector 10 can be enhanced.

Furthermore, because the inner circumferential surfaces 222, 112 of the pipe body 200 and the connector body 11 are flush, pumped water can flow smoothly in the holes 221, 111 of the pipe 20 and the connector 10 without resistance.

The advantages of the underwater pipe and connector assembly according to the present disclosure can be summarized as follows:

1) By utilizing the reinforcing unit 30 in cooperation with the clamping effect of the clamping unit 40, the connector 10 and the pipe 20 can be stably connected along the longitudinal axis (L), so that not only is the cost of the underwater pipe and connector assembly can be lowered, the structural strength of the junction between the connector 10 and the pipe 10 can be enhanced as well.

2) With the inner circumferential surfaces 222, 112 of the pipe body 200 and the connector body 11 being flush, turbulence will not occur during pumping of the seawater. Further, with the presence of the reinforcing unit 30 between the junction of the pipe 10 and the connector 20, the structure of the junction there-between is strengthened, so that the junction cannot be easily broken due to water pressure.

3) Since the underwater pipe and connector assembly of the present disclosure is composed of the connector 10, the underwater pipe 20 and the reinforcing unit 30, an overall structure of the assembly is simple, and the arrangement of the components during production is easy. Hence, the structural strength of the underwater pipe and connector assembly can indeed be strengthened, so that the service life thereof can be prolonged.

The method of assembling the large-diameter underwater pipe 20 and the connector 10 according to the present disclosure is described with reference to FIGS. 2 to 7, and includes the following steps:

Step 1: preparing the underwater pipe 20, the connector 10, the reinforcing unit 30 and the clamping unit 40, the reinforcing unit 30 including the annular first and second reinforcing layers 31, 31' and the first and second outer coils 32, 32', the clamping unit 40 including the support member 41, the inflatable ring 42 and the two clamping members 43;

Step 2: inserting the connector body 11 into the connecting end section 21 of the underwater pipe 20 so as to press radially outward the connecting end section 21 such that the outer diameter of the connecting end section 21 is larger than that of the pipe body 200, and the inner circumferential surfaces 222, 112 are flush with each other;

Step 3: consecutively disposing the first outer coil 32 around the connecting end section 21 and the outer circumferential surface 223 of the pipe body 200 immediately adjacent the connecting end section 21 and disposing the first reinforcing layer 31 around the first outer coil 32, so that the first fixed cover section 311 covers the connecting end section 21 and the second fixed cover section 312 covers the outer circumferential surface 223 of the pipe body 200 immediately adjacent the connecting end section 21;

Step 4: consecutively disposing the second outer coil 32' around the first reinforcing layer 31 and disposing the second reinforcing layer 31' around the second outer coil 32', so that the first fixed cover section 311' covers the first fixed cover section 311 and the second fixed cover section 312' covers the second fixed cover section 312;

Step 5: disposing the inflatable ring 42 around the support ring 411 of the support member 41;

Step 6: moving the support member 41 and the inflatable ring 42 into the pipe 20 via the hole 111 of the connector body 11 until they are located at a position corresponding to the inner circumferential surface 222 of the pipe body 200 immediately adjacent the connecting end section 21, and then clamping and tightening the clamping frames 431 of the clamping members 43 respectively around the first and second fixed cover sections 311', 312' of the reinforcing unit 30, the movement of the support member 41 and the inflatable ring 42 within the pipe 20 being realized through the rollers 415 of the support member 41;

Step 7: inflating the inflatable ring 42 to expand radially outward so that the pipe body 200 immediately adjacent the connecting end section 21 and the reinforcing unit 30 are pressed radially outward by the support member 41, while the clamping member 43, which is sleeved on the second fixed cover section 312', moves radially inward to generate a clamping effect on the pipe body 200 immediately adjacent the connecting end section 21, and the clamping member 43, which is sleeved on the first fixed cover section 311', also moves radially inward to generate a clamping effect on the connecting end section 21 of the pipe 20;

Step 8: energizing the inner coil 210 and the first and second outer coils 32, 32' so as to generate heat which melts the connecting end section 21, the pipe body 200 immediately adjacent the connecting end section 21, and the first and second reinforcing layers 31, 31', so that the pipe 20 and the reinforcing layers 31, 31' can be integrally connected as one body, and the connecting end section 21 can be further welded to the connector body 11; and Step 9: removing the clamping unit 40 from the pipe 20.

By using the foregoing steps, the pipe 20, the connector 10 and the reinforcing unit 30 are firmly connected, and the manufacturing and assembly process of the components are easy. Further, by utilizing the reinforcing unit 30 in cooperation with the clamping effect of the clamping unit 40, the connector 10 and the pipe 20 can be firmly connected, so that not only is the cost of the pipe and connector assembly can be lowered, the structural strength at the junction between the connector 10 and the pipe 10 can be enhanced as well.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An underwater pipe and connector assembly comprising:
   an underwater pipe made of plastic and having a pipe body extending along a longitudinal axis, and an annular connecting end section at one end of said pipe body, said pipe body having inner and outer circumferential surfaces;
   a connector made of metal and including a tubular connector body extending along the longitudinal axis and fixed in said connecting end section, an annular flange extending radially and outwardly from a peripheral end of said connector body, and an inner coil embedded between said connector body and said connecting end section;
   a reinforcing unit surrounding said pipe body at a position corresponding to a junction between said pipe body and said connector body, and including at least one annular reinforcing layer made of plastic and at least one outer coil, said at least one annular reinforcing layer including a first fixed cover section fused to and covering said connecting end section, and a second fixed cover section connected to said first fixed cover section along the longitudinal axis (L) and fused to and covering said outer circumferential surface of said pipe body immediately adjacent said connecting end section, said at least one outer coil extending from said first fixed cover section to said second fixed cover section and being embedded between said first fixed cover section and said connecting end section and between said second fixed cover section and said outer circumferential of said pipe body immediately adjacent said connecting end section; and
   a clamping unit removably mounted on said pipe body at the position corresponding to the junction between said pipe body and said connector body, said clamping unit including a support member movably disposed at a position corresponding to said inner circumferential surface of said pipe body immediately adjacent said connecting end section, an inflatable ring disposed between said support member and said inner circumferential surface of said pipe body immediately adjacent said connecting end section, and at least one clamping member detachably clamped around an outer portion of said reinforcing unit.

2. The underwater pipe and connector assembly as claimed in claim 1, wherein said support member includes a support ring surrounding the longitudinal axis, a connecting ring disposed inside said support ring, a plurality of angularly spaced-apart spokes connected between said support ring and said connecting ring, a cross frame connected to said connecting ring, and a plurality of rollers mounted on said cross frame and rollable inside said connector and said underwater pipe.

3. The underwater pipe and connector assembly as claimed in claim 1, wherein said connector body has an outer circumferential surface fixed to an inner circumferential surface of said connecting end section, and a wave pattern formed on said outer circumferential surface.

4. The underwater pipe and connector assembly as claimed in claim 1, wherein a length of said first fixed cover section along the longitudinal axis is greater than that of said second fixed cover section along the longitudinal axis.

5. A method of assembling an underwater pipe and a connector, comprising the steps of:
   (A) preparing a connector, an underwater pipe, a reinforcing unit and a clamping unit, the underwater pipe made of plastic and having a pipe body extending along a longitudinal axis, and an annular connecting end section at one end of said pipe body, said pipe body having inner and outer circumferential surfaces; the connector made of metal and including a tubular connector body extending along the longitudinal axis and fixed in said connecting end section, an annular flange extending radially and outwardly from a peripheral end of said connector body, and an inner coil embedded between said connector body and said connecting end section, the inner coil sleeved on an outer circumferential surface of the connector body; the reinforcing unit surrounding said pipe body at a position corresponding to a junction between said pipe body and said connector body, and including at least one annular reinforcing layer made of plastic and at least one outer coil, said at least one annular reinforcing layer including a first fixed cover section fused to and covering said connecting end section, and a second fixed cover section connected to said first fixed cover section along the longitudinal axis (L) and fused to and covering said outer circumferential surface of said pipe body immediately adjacent said connecting end section, said at least one outer coil extending from said first fixed cover section to said second fixed cover section and being embedded between said first fixed cover section and said connecting end section and between said second fixed cover section and said outer circumferential of said pipe body immediately adjacent said connecting end section; and the clamping unit removably mounted on said pipe body at the position corresponding to the junction between said pipe body and said connector body, said clamping unit including a support member movably disposed at a position corresponding to said inner circumferential surface of said pipe body immediately adjacent said connecting end section, an inflatable ring disposed between said support member and said inner circumferential surface of said pipe body immediately adjacent said connecting end section, and at least one clamping member detachably clamped around an outer portion of said reinforcing unit;
   (B) inserting the connector body into the connecting end section of the underwater pipe so as to press radially outward the connecting end section;
   (C) consecutively disposing the at least one outer coil and the at least one annular reinforcing layer around the underwater pipe such that the first fixed cover section of the at least one annular reinforcing layer corresponds to the tubular connector body and the connecting end section of the underwater pipe and such that the second fixed cover section of the at least one annular reinforcing layer corresponds to an outer circumferential surface of the pipe body immediately adjacent the connecting end section;

(D) clamping tightly the reinforcing unit around the underwater pipe using the clamping unit;

(E) energizing the inner coil and the at least one outer coil so as to generate heat which melts the connecting end section, the pipe body immediately adjacent the connecting end section, and the at least one annular reinforcing layer to integrally connect the underwater pipe and the reinforcing unit as one body and to fixedly connect the connecting end section and the connector; and (F) removing the clamping unit from the underwater pipe.

6. The method as claimed in claim 5, further comprising the steps of disposing the inflatable ring around the support ring and moving the inflatable ring and the support member inside the pipe body and the connector body to a position corresponding to an inner circumferential surface of the pipe body immediately adjacent the connecting end section after step (C) and before step (D), and inflating the inflatable ring after step (D) and before step (E).

7. The method as claimed in claim 6, wherein, in step (A), the support member further includes a connecting ring disposed inside the support ring, a plurality of angularly spaced-apart spokes connected between the support ring and the connecting ring, a cross frame connected to the connecting ring, and a plurality of rollers mounted on the cross frame, the step of moving the inflatable ring and the support member inside the pipe body and the connector body being realized through the rollers.

8. The method as claimed in claim 7, wherein, in step (A), the connector body has an outer circumferential surface, and a wave pattern formed on the outer circumferential surface, and wherein the connecting end section is welded to the outer circumferential surface of the connector body in step (E).

9. The method as claimed in claim 5, wherein, in step (C), a length of the first fixed cover section along the longitudinal axis is greater than that of the second fixed cover section along the longitudinal axis.

* * * * *